(12) United States Patent
Kawashima et al.

(10) Patent No.: US 8,479,165 B1
(45) Date of Patent: *Jul. 2, 2013

(54) SYSTEM FOR TESTING OPERATION OF SOFTWARE

(75) Inventors: Ken Kawashima, Tokyo (JP); Takashi Yanagisawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,376

(22) Filed: Apr. 16, 2012

Related U.S. Application Data

(63) Continuation of application No. 13/447,333, filed on Apr. 16, 2012.

(51) Int. Cl.
*G06F 9/44* (2006.01)

(52) U.S. Cl.
USPC ............ 717/124; 717/126; 717/131; 717/132

(58) Field of Classification Search
None
See application file for complete search history.

(56) References Cited

U.S. PATENT DOCUMENTS

| | | | | |
|---|---|---|---|---|
| 7,028,290 | B2* | 4/2006 | Srivastava et al. | 717/124 |
| 7,490,319 | B2* | 2/2009 | Blackwell et al. | 717/124 |
| 7,506,312 | B1* | 3/2009 | Girolami-Rose et al. | 717/124 |
| 8,230,401 | B2* | 7/2012 | Branca et al. | 717/135 |
| 2003/0093716 | A1* | 5/2003 | Farchi et al. | 714/34 |
| 2003/0204836 | A1* | 10/2003 | Srivastava et al. | 717/124 |
| 2004/0060044 | A1* | 3/2004 | Das et al. | 717/171 |
| 2007/0094189 | A1* | 4/2007 | Yamamoto et al. | 706/45 |
| 2007/0220479 | A1* | 9/2007 | Hughes | 717/100 |
| 2008/0215921 | A1* | 9/2008 | Branca et al. | 714/38 |

FOREIGN PATENT DOCUMENTS

| | | |
|---|---|---|
| JP | 5094298 | 4/1993 |
| JP | 5313881 | 11/1993 |
| JP | 7210424 | 8/1994 |
| JP | 11120029 | 4/1999 |
| JP | 11282722 | 10/1999 |
| JP | 11306046 | 11/1999 |
| JP | 2003009283 | 4/2003 |
| JP | 2003256206 | 9/2003 |
| JP | 2005118403 | 5/2005 |
| JP | 2006227958 | 8/2006 |

(Continued)

OTHER PUBLICATIONS

U.S. Appl. No. 13/447,333, filed Apr. 16, 2012.

*Primary Examiner* — Insun Kang
(74) *Attorney, Agent, or Firm* — Schmeiser, Olsen & Watts, LLP; John Pivnichny

(57) ABSTRACT

A system for implementing a method for processing test results from testing operation of software. A test result of pass, fail status, or unperformed is received for each test case of a test performed for each release of the software. A group to which each test belongs is ascertained. A test result stability index is calculated for each test case as being proportional to a total number of consecutive releases that include and are prior to the last release of the software such that the test result for each of the consecutive releases denotes a pass. A module stability index is calculated for each test case as being a summation over a product of a weight at each release and a binary stability indicator of 0 at each release for which the test result is changed from that of the immediately prior release and 1 at every other release.

16 Claims, 11 Drawing Sheets

FOREIGN PATENT DOCUMENTS

| | | |
|---|---|---|
| JP | 2007102475 | 4/2007 |
| JP | 2008065687 | 3/2008 |
| JP | 200625158 | 9/2008 |
| JP | 2009169828 | 7/2009 |
| JP | 2009181536 | 8/2009 |
| JP | 2009217664 | 9/2009 |
| JP | 2009245380 | 10/2009 |
| JP | 2010102624 | 5/2010 |

* cited by examiner

FIG. 2

| TEST CASE NAME | TEST RESULT HISTORY | GROUP IDENTIFIER | TEST RESULT STABILITY INDEX | MODULE STABILITY INDEX | TEST TIME PERIOD INFORMATION |
|---|---|---|---|---|---|
| TEST CASE A | (1.1, P), (1.2, P), (1.3, P), (2.0, P), (2.1, P), (2.2, P), (2.3, P), (2.4, P), (3.0, P) | | | | Ta09 |
| TEST CASE B | (1.1, P), (1.2, P), (1.3, P), (2.0, P), (2.1, F), (2.2, P), (2.3, P), (2.4, P), (3.0, P) | | | | Tb09 |
| TEST CASE C | (1.1, F), (1.2, F), (1.3, F), (2.0, F), (2.1, F), (2.2, P), (2.3, P), (2.4, P), (3.0, P) | | | | Tc09 |
| ... | ... | | | | ... |

FIG. 3

| RELEASE | 1.1 | 1.2 | 1.3 | 2.0 | 2.1 | 2.2 | 2.3 | 2.4 | 3.0 | 4.0 | GROUP IDENTIFIER |
|---|---|---|---|---|---|---|---|---|---|---|---|
| RELEASE DATE | D01 | D02 | D03 | D04 | D05 | D06 | D07 | D08 | D09 | D10 | |
| TEST CASE A | ○ | ○ | ○ | ○ | ○ | ○ | ○ | ○ | ○ | ○ | 1111111111 |
| TEST CASE B | ○ | ○ | ○ | ○ | × | ○ | ○ | ○ | ○ | ○ | 1111011111 |
| TEST CASE C | × | × | × | × | × | ○ | ○ | ○ | ○ | ○ | 0000011111 |
| TEST CASE D | × | × | × | × | × | ○ | ○ | ○ | ○ | ○ | 0000011111 |
| TEST CASE E | | ○ | ○ | ○ | ○ | ○ | ○ | ○ | ○ | ○ | 2111111111 |

| RELEASE | 1.1 | 1.2 | 1.3 | 2.0 | 2.1 | 2.2 | 2.3 | 2.4 | 3.0 | 4.0 | PASS DATE |
|---|---|---|---|---|---|---|---|---|---|---|---|
| RELEASE DATE | D01 | D02 | D03 | D04 | D05 | D06 | D07 | D08 | D09 | D10 | |
| TEST CASE A | ○ | ○ | ○ | ○ | ○ | ○ | ○ | ○ | ○ | ○ | D01-D10 |
| TEST CASE B | ○ | ○ | ○ | ○ | × | ○ | ○ | ○ | ○ | ○ | D06-D10 |
| TEST CASE C | × | × | × | × | × | ○ | ○ | ○ | ○ | ○ | D06-D10 |

(b)

| RELEASE | 1.1 | 1.2 | 1.3 | 2.0 | 2.1 | 2.2 | 2.3 | 2.4 | 3.0 | 4.0 |
|---|---|---|---|---|---|---|---|---|---|---|
| RELEASE DATE | D01 | D02 | D03 | D04 | D05 | D06 | D07 | D08 | D09 | D10 |
| TEST CASE A | 1 | 2 | 3 | 4 | 5 | 6 | 7 | 8 | 9 | 10 |
| TEST CASE B | 1 | 2 | 3 | 4 | 0 | 1 | 2 | 3 | 4 | 5 |
| TEST CASE C | 0 | 0 | 0 | 0 | 0 | 1 | 2 | 3 | 4 | 5 |

(c)

| RELEASE | 1.1 | 1.2 | 1.3 | 2.0 | 2.1 | 2.2 | 2.3 | 2.4 | 3.0 | 4.0 |
|---|---|---|---|---|---|---|---|---|---|---|
| RELEASE DATE | D01 | D02 | D03 | D04 | D05 | D06 | D07 | D08 | D09 | D10 |
| TEST CASE A | 1 | 1 | 1 | 1 | 1 | 1 | 1 | 1 | 1 | 1 |
| TEST CASE B | 1 | 1 | 1 | 1 | 0 | 0.17 | 0.29 | 0.38 | 0.44 | 0.50 |
| TEST CASE C | 0 | 0 | 0 | 0 | 0 | 0.17 | 0.29 | 0.38 | 0.44 | 0.50 |

| RELEASE | 1.1 | 1.2 | 1.3 | 2.0 | 2.1 | 2.2 | 2.3 | 2.4 | 3.0 | 4.0 |
|---|---|---|---|---|---|---|---|---|---|---|
| RELEASE DATE | D01 | D02 | D03 | D04 | D05 | D06 | D07 | D08 | D09 | D10 |
| TEST CASE A | ○ | ○ | ○ | ○ | ○ | ○ | ○ | ○ | ○ | ○ |
| TEST CASE B | ○ | ○ | ○ | ○ | × | ○ | ○ | ○ | ○ | ○ |
| TEST CASE C | × | × | × | × | × | ○ | ○ | ○ | ○ | ○ |

(b)

| RELEASE | 1.1 | 1.2 | 1.3 | 2.0 | 2.1 | 2.2 | 2.3 | 2.4 | 3.0 | 4.0 |
|---|---|---|---|---|---|---|---|---|---|---|
| RELEASE DATE | D01 | D02 | D03 | D04 | D05 | D06 | D07 | D08 | D09 | D10 |
| TEST CASE A | 1 | 1 | 1 | 1 | 1 | 1 | 1 | 1 | 1 | 1 |
| TEST CASE B | 1 | 1 | 1 | 1 | 0 | 0 | 1 | 1 | 1 | 1 |
| TEST CASE C | 1 | 1 | 1 | 1 | 1 | 0 | 1 | 1 | 1 | 1 |

FIG. 8

| TEST CASE NAME | TEST RESULT HISTORY | GROUP IDENTIFIER | TEST RESULT STABILITY INDEX | MODULE STABILITY INDEX | TEST TIME PERIOD INFORMATION |
|---|---|---|---|---|---|
| TEST CASE A | (1.1, P), (1.2, P), (1.3, P), (2.0, P), (2.1, P), (2.2, P), (2.3, P), (2.4, P), (3.0, P), (4.0, P) | 1111111111 | 1.0 | 1.0 | Ta10 |
| TEST CASE B | (1.1, P), (1.2, P), (1.3, P), (2.0, P), (2.1, F), (2.2, P), (2.3, P), (2.4, P), (3.0, P), (4.0, P) | 1111011111 | 0.5 | 0.8 | Tb10 |
| TEST CASE C | (1.1, F), (1.2, F), (1.3, F), (2.0, F), (2.1, F), (2.2, P), (2.3, P), (2.4, P), (3.0, P), (4.0, P) | 0000011111 | 0.5 | 0.89 | Tc10 |
| ... | ... | ... | ... | ... | ... |

FIG. 9

| GROUP IDENTIFIER | TEST RESULT STABILITY INDEX | MODULE STABILITY INDEX | COUNT | DETERMINATION | SELECTED |
|---|---|---|---|---|---|
| 1111111111111111111111 | 1 | 1 | 2189 | | 2189 |
| 1111111111111111110111 | 0.130434783 | 0.845849802 | 6 | FALSE | 6 |
| 1111111111111110111111 | 0.260869565 | 0.869565217 | 1 | FALSE | 1 |
| 1111111111111101111111 | 0.391304348 | 0.893280632 | 5 | TRUE | 1 |
| 1111111111111101101111 | 0.260869565 | 0.76284585 | 1 | FALSE | 1 |
| 1111111111111101111111 | 0.434782609 | 0.901185771 | 5 | TRUE | 1 |
| 1111111111111001111111 | 0.391304348 | 0.897233202 | 2 | TRUE | 1 |
| 1111111111111000111111 | 0.347826087 | 0.893280632 | 3 | FALSE | 3 |
| 1111111111111111111111 | 0.956521739 | 0.996047431 | 8 | TRUE | 1 |
| 0111111111111111111111 | 0.47826087 | 0.932806324 | 1 | TRUE | 1 |
| 0010000000001111111111 | 0.434782609 | 0.877470356 | 1 | TRUE | 1 |
| 0000001111101111111111 | 0.391304348 | 0.873517787 | 4 | TRUE | 1 |
| 0000001111111100111111 | 0.347826087 | 0.869565217 | 2 | FALSE | 2 |
| 0000001111110101111111 | 0.434782609 | 0.782608696 | 2 | FALSE | 2 |
| 0000000000001000001111 | 0.260869565 | 0.841897233 | 1 | FALSE | 1 |
| 0000000000000000111111 | 0.47826087 | 0.95256917 | 198 | TRUE | 1 |
| 0000000000000011111111 | 0.434782609 | 0.948616601 | 1 | TRUE | 1 |
| 0000000000000101000000 | 0 | 0.76284585 | 1 | FALSE | 1 |
| 0000000000000001111111 | 0.391304348 | 0.944664032 | 2 | TRUE | 1 |
| 0000000000000011111111 | 0.347826087 | 0.940711462 | 3 | FALSE | 3 |
| 0000000000000000111111 | 0.260869565 | 0.932806324 | 5 | FALSE | 5 |
| 0000000000000000000000 | 0 | 1 | 2 | FALSE | 2 |
| TOTAL | | | 2443 | | 2226 |

SYSTEM FOR TESTING OPERATION OF SOFTWARE

This application is a continuation application claiming priority to Ser. No. 13/447,333; filed Apr. 16, 2012.

TECHNICAL FIELD

The present invention relates generally to a system for testing the operation of software, an in particular, the present invention relates to a system for testing the operation of each of multiple versions of software.

BACKGROUND

Data that can normally be used by a certain version of software cannot sometimes normally be used when the version of software is changed. Examples of such software include Computer-Aided Design (CAD) software such as CATIA®. A version change is caused by, for example, making a new release or applying a critical patch.

In making a new release or applying a critical patch, the developer of the CAD software (hereafter referred to as "developer") checks whether the bug in question has been corrected. At this time, ideally, the developer checks portions in which the bug in question has not occurred, for example, previously corrected portions so as to guarantee that the correction of the bug does not affect other portions, that is, that the quality of the CAD software is not unexpectedly degraded due the correction of the bug.

However, for CAD software, data used thereby, the usage (functions to be used) and quality standard (required accuracy) thereof, and the like vary among user companies of the CAD software (hereafter simply referred to as "users"). For this reason, it is difficult for the developer to grasp these. Since such data and usage are knowhow, the user cannot make them public.

In view of the foregoing, it is difficult for the developer to conduct a test covering the usage employed by each user each time a new release is made or a critical patch is applied, so as to guarantee that the correction of the bug does not affect other portions.

For this reason, it is useful for the user to conduct a test using user data each time a new release is made or a critical patch is applied.

A technology performs: a state identification process of identifying a state where an external module is called, by referring to a state outputted by model inspection and state space represented by state transition; a path extraction process of extracting a path from a state where the identified external module is called to an initial state by referring to state transition; a property application process of comparing the extracted path with a property condition made in the form of "if A (condition), then B (result)" on the basis of the program specification and detecting an extracted path meeting the condition; a scenario classification process of classifying paths extracted by condition; and a test case formation process of forming the extracted paths classified by the scenario classification process and results expected to be property results corresponding to the extracted paths into test cases.

A technology provides a virtual directory independently of an actual directory in a hard disk of a first server included in a production apparatus, which is actually running. Data related to a program which is registered by the user in a job registration unit and which is to be tested is stored in the virtual directory. The job processing unit performs an actual process using an actual job processing unit, as well as performs a program to be tested, using a virtual job processing unit. A file analysis unit identifies the details and characteristics of the process by analyzing respective input/output data of the original program and the current program and then creates a test case and makes a determination as to the test result. A release processing unit deletes the test-related data stored in the virtual directory after the test and transfers such as a program that can be released, to the actual directory.

A technology disclosed deletes duplicate test cases using a trace function embedding unit for embedding a process for tracing the flow of a process, in source code to be tested and a test result analysis unit for connecting a trace information table and a test result table outputted by an automatic testing system and then displays the test result table on a display unit.

BRIEF SUMMARY

The present invention provides a computer system comprising a processor, a memory coupled to the processor, and a computer readable storage device coupled to the processor, said storage device containing program code configured to be executed by the processor via the memory to implement a method for processing test results from testing operation of software, said method comprising:

said processor receiving a test result for each test case of multiple test cases for a test performed for each release of multiple releases of the software, said test result for each test for each release being a first character string denoting a pass status for the test, a second character string denoting a fail status for the test, or a third character string denoting an unperformed status for the test indicating that the test has not been performed;

said processor ascertaining a group to which each test belongs, said ascertaining comprising determining a group identifier of the group to which each test belongs, said group identifier for each test case being a group character string determined from the test results of the tests performed for all releases of the multiple releases for said each test case, said ascertained groups consisting of multiple groups, each group of at least one group of the multiple groups comprising at least two test cases of the multiple test cases;

said processor calculating a test result stability index for each test case as being proportional to a total number of consecutive releases that include and are prior to the last release of the multiple releases of the software such that the test result for each release of the consecutive releases is the first character string denoting the pass status;

said processor calculating a module stability index for each test case as being a summation over a product of a weight at each release and a binary stability indicator of 0 at each release for which the test result is changed from the test result at the immediately prior release and 1 at every other release; and for each test case, said processor storing the group identifier, the test result stability index, and the module stability index in a hardware storage unit of the computer system.

The present invention provides a computer program product, comprising a computer readable hardware storage device having a computer readable program code stored therein, said program code configured to be executed by a processor of a computer system to implement a method for processing test results from testing operation of software, said method comprising:

said processor receiving a test result for each test case of multiple test cases for a test performed for each release of multiple releases of the software, said test result for each test for each release being a first character string denoting a pass status for the test, a second character string denoting a fail status for the test, or a third character string denoting an unperformed status for the test indicating that the test has not been performed;

said processor ascertaining a group to which each test belongs, said ascertaining comprising determining a group identifier of the group to which each test belongs, said group identifier for each test case being a group character string determined from the test results of the tests performed for all releases of the multiple releases for said each test case, said ascertained groups consisting of multiple groups, each group of at least one group of the multiple groups comprising at least two test cases of the multiple test cases;

said processor calculating a test result stability index for each test case as being proportional to a total number of consecutive releases that include and are prior to the last release of the multiple releases of the software such that the test result for each release of the consecutive releases is the first character string denoting the pass status;

said processor calculating a module stability index for each test case as being a summation over a product of a weight at each release and a binary stability indicator of 0 at each release for which the test result is changed from the test result at the immediately prior release and 1 at every other release; and for each test case, said processor storing the group identifier, the test result stability index, and the module stability index in a hardware storage unit of the computer system.

BRIEF DESCRIPTION OF THE DRAWINGS

FIG. 2 is a diagram showing an example of data stored in a test result storage unit according to embodiments of the present invention.

FIG. 3 is a diagram showing a test case group determination process according to embodiments of the present invention.

FIGS. 4(a) to 4(c) are diagrams showing a test result stability index calculation method according to embodiments of the present invention.

FIGS. 5(a) and 5(b) are diagrams showing a module stability index calculation method according to embodiments of the present invention.

FIG. 8 is a diagram showing an example of data stored in the test result storage unit according to embodiments of the present invention.

FIG. 9 is a diagram showing a test list creation process according to this embodiment.

DETAILED DESCRIPTION

Figure 1:
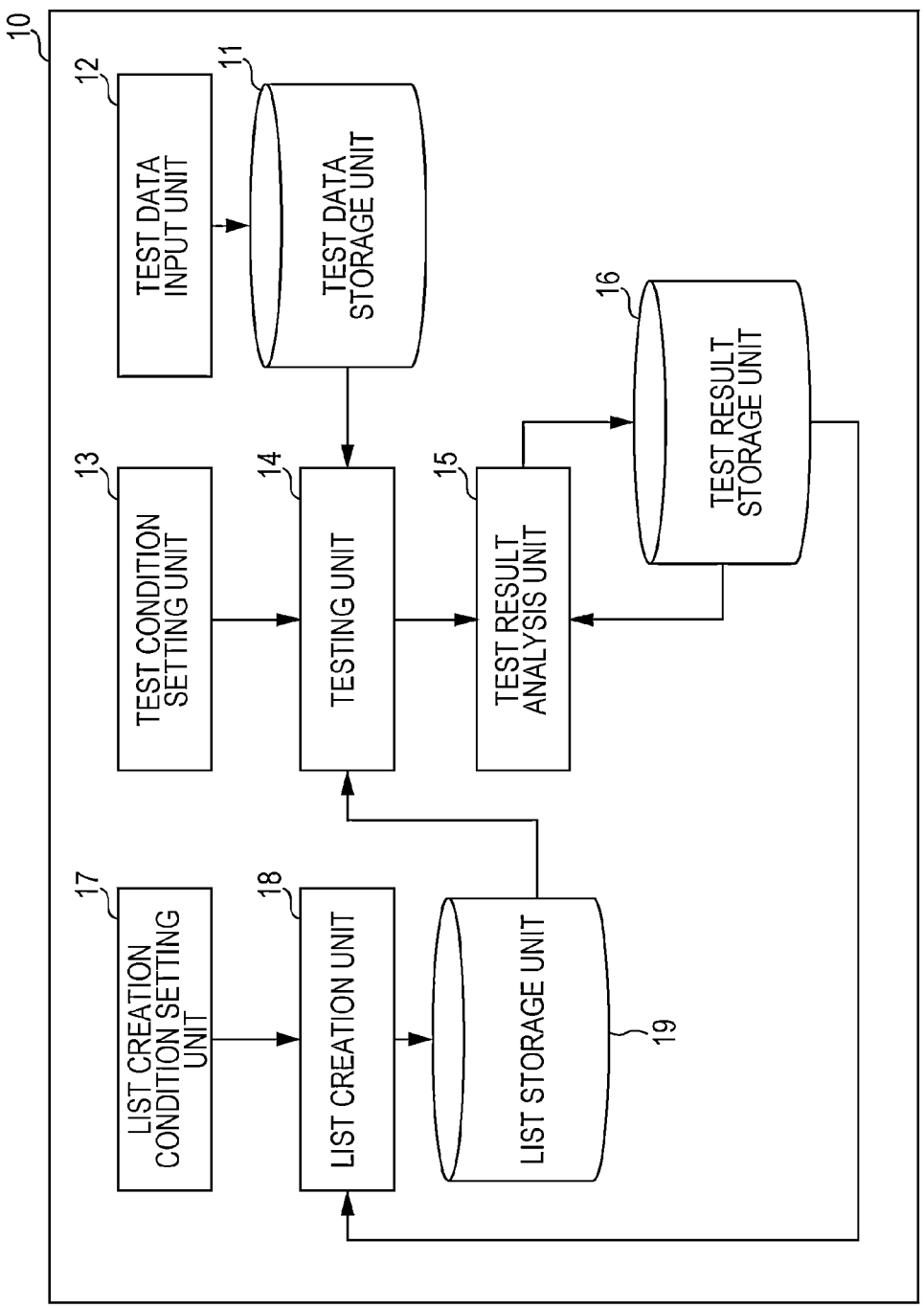
FIG. 1 is a block diagram showing an example configuration of a testing apparatus according to embodiments of the present invention.

Hereafter, embodiments of the present invention will be described in detail with reference to the accompanying drawings.

As seen, it is useful for the user to conduct a test using user data each time the version of the software is changed.

However, where a test is conventionally conducted using user data, overlapping tests may be conducted uselessly. This is because the product specification of Computer-Aided Design (CAD) software is not usually disclosed.

For example, since it is necessary to complete verification of the CAD software early before applying a critical patch thereto, tests needs to be completed within a limited time period. For this reason, such overlapping tests must be precluded as much as possible. That is, if tests are conducted as usual, the number of man-hours for tests is enormously increased. For this reason, it is desired to optimize tests.

Further, it is more useful to preclude such overlapping tests and add new user data so as to cope with other bugs or support other functions.

None of the current technologies contribute to a reduction in the number of tests uselessly conducted each time the version of software is changed.

Accordingly, the present invention reduces the number of tests uselessly conducted when the operation of each of multiple releases of software is tested using multiple pieces of data.

The present invention provides an apparatus for testing operation of a plurality of versions of software. The testing apparatus includes: a storage unit that stores a plurality of pieces of data and pieces of data identification information for identifying the pieces of data as associated with each other; an acquisition unit that acquires test result information where test result strings obtained when the operation of each of the plurality of version of software is tested using the pieces of data are associated with the corresponding pieces of data identification information for identifying the pieces of data; a group information generation unit that generates group information by associating the following information with each other: pieces of group identification information for identifying a plurality of groups obtained by grouping the pieces of data, using the test result strings associated with pieces of data identification information for identifying pieces of data belonging to each group in the test result information, the test result strings being identical or similar to each other; pieces of test result stability information representing stability of test results obtained when the operation of each of the versions of software is tested using pieces of data belonging to each group, using the number of continuous test results indicating success in the corresponding test result strings; pieces of module stability information representing stability of a module of the software tested using pieces of data belonging to each group, using the number of variations in test result in the corresponding test result strings; and pieces of data identification information for identifying pieces of data belonging to each group; a list creation unit that, if at least two pieces of data identification information are associated with one of the pieces of group identification information for identifying the groups in the group information, if test result stability information associated with the group identification information in the group information indicates stability exceeding a predetermined first standard, if module stability information associated with the group identification information in the group information indicates stability exceeding a predetermined second standard but shows that there is one or more variations in test result in the test result string, creates a list containing a particular piece of data identification information out of the at least two pieces of data identification information as data identification information for identifying pieces of data belonging to each group and does not contain data identification information other than the particular piece of data identification information; and a testing unit that tests a new version of the software using data stored in the storage unit as associated with the particular piece of data identification information contained in the list created by the list creation unit as data identification information for identifying pieces of data belonging to each group.

The present invention also provides an apparatus for testing operation of a plurality of versions of software. The apparatus includes: an acquisition unit that acquires test result strings obtained when the operation of each of the versions of software is tested using each of a plurality of pieces of data; a generation unit that, with respect to each of a plurality of groups obtained by grouping the plurality of pieces of data, the test result strings acquired by the acquisition unit with respect to pieces of data belonging to each group being identical or similar to each other, generates test result stability information indicating stability of test results obtained when operation of each of the versions of software is tested using pieces of data belonging to each group; and a selection unit that, if the test result stability information generated by the generation unit with respect to a group to which at least two pieces of data belong of the groups indicates stability exceeding a predetermined standard, selects data to be used to test the operation of the software from among the at least two pieces of data.

The generation unit may generate the test result stability information on the basis of the occurrence situation of a test result indicating success in a test result string obtained when the operation of each of the versions of software is tested using pieces of data belonging to each group.

The generation unit may generate the test result stability information indicating higher stability as test results obtained when testing the operation of each of versions continuing back from the latest version out of the versions continue indicating success longer in a test result string obtained when the operation of each of the versions of software is tested using pieces of data belonging to each group.

The generation unit may further generate module stability information indicating stability of a module of the software when the software is tested using pieces of data belonging to each group, and when the module stability information generated by the generation unit with respect to groups to which the at least two pieces of data belong indicates stability exceeding a predetermined standard, the selection unit may select data to be used to test the operation of the software from among the at least two pieces of data.

The generation unit may generate the module stability information on the basis of the variation situation of a test result in a test result string obtained when the operation of each of the versions of software is tested using pieces of data belonging to each group.

The generation unit may generate the module stability information indicating higher stability as a variation degree obtained by adding a weight corresponding to the newness of each of the versions to variations in test results obtained when the operation of each of the versions of software is tested and summing up the variations is lower in a test result string obtained when the operation of each of the versions of software is tested using pieces of data belonging to each group.

The selection unit selects data to be used to test the operation of the software from among the at least pieces of data on the basis of time taken to test the operation of the software using each of the at least two pieces of data.

The present invention also provides a method for testing operation of each of a plurality of versions of software. The method includes the steps: acquiring test result strings obtained when the operation of each of the versions of software is tested using each of a plurality of pieces of data; with respect to each of a plurality of groups obtained by grouping the plurality of pieces of group, the test result strings acquired with respect to pieces of data belonging to each group being identical or similar to each other, generating test result stability information indicating stability of test results obtained when the operation of each of the versions of software is tested using pieces of data belonging to each group; and if the test result stability information generated with respect to a group to which at least two pieces of data belong of the groups indicates stability exceeding a predetermined standard, selecting data to be used to test the operation of the software from among the at least two pieces of data.

The present invention also provides a program product comprising program code for testing operation of each of a plurality of versions of software. In accordance with the program code, the computer functions as: an acquisition unit that acquires test result strings obtained when the operation of each of the versions of software is tested using each of a plurality of pieces of data; a generation unit that, with respect to each of a plurality of groups obtained by grouping the plurality of pieces of group, the test result strings acquired by the acquisition unit with respect to pieces of data belonging to each group being identical or similar to each other, generates test result stability information indicating stability of test results obtained when the operation of each of the versions of software is tested using pieces of data belonging to each group; and a selection unit that, when the test result stability information generated by the generation unit with respect to a group to which at least two pieces of data belong of the groups indicates stability exceeding a predetermined standard, selects data to be used to test the operation of the software from among the at least two pieces of data.

According to the present invention, it is possible to reduce the number of tests uselessly conducted when the operation of each of multiple releases of software is tested using multiple pieces of data.

In one embodiment, CAD software with respect to which it is difficult to determine ultimate acceptance unless user data is used is tested comprehensively and efficiently under a time constraint in a black box way, that is, without knowing its internal structure, using data which has caused a bug in the part and considering the use situation of the CAD software by the user and the change situation of the CAD software module by the user.

FIG. 1 is a block diagram showing an example configuration of a testing apparatus 10 according to embodiments of the present invention. For example, a manufacturer of assembled products generates shape data representing the shape of a part using CAD software and supplies the shape data to a parts manufacturer to request the manufacture of the part. At this time, the CAD data generated by the manufacturer of assembled products using the CAD software contains design information specific to the manufacturer. For this reason, the manufacturer does not supply the CAD data to the parts manufacturer with the data remaining intact and instead supplies thereto shape data converted using a function of the CAD software, that is, data from which the design information is deleted. Meanwhile, a correction patch may be applied to CAD software such as in order to correct a bug in the CAD software. However, for example, where a correction patch is applied in accordance with a request from another manufacturer of assembled products, use of the correction-patch-applied CAD software may affect other portions. For this reason, each time a correction patch is applied, a test must be conducted as to whether shape data converted from CAD data using the CAD software is data obtained by correctly extracting a shape-related portion from the CAD data. For this reason, the testing apparatus 10 conducts such a test on different versions (releases) of CAD software each time a correction patch is applied.

As shown, the testing apparatus 10 includes a test data storage unit 11, a test data input unit 12, a test condition setting unit 13, a testing unit 14, a test result analysis unit 15, a test result storage unit 16, a list creation condition setting unit 17, a list creation unit 18, and a list storage unit 19. The preceding storage units (11, 16, 19) are hardware storage units of the computer system depicted in FIG. 11 used to implement the present invention.

The test data storage unit 11 is a database for storing test case names and test data as associated with each other. A test case name here refers to a name for identifying test data and may be, for example, the file name of test data. Test data refers to data to be used in a test conducted by the testing unit 14, of CAD data that has yet to be converted into shape data by the CAD software. In this embodiment, test data is used as an example of data, and a test case name is used as an example of data identification information. The test data storage unit 11 is provided as an example of a storage unit for storing data and data identification information as associated with each other.

The test data input unit 12 inputs test data to the test data storage unit 11 either before conducting a test using the first release of CAD software or at any timing when addition of data is needed after the test is conducted. At this time, the test data input unit 12 inputs CAD data in which the user has caused a bug in the past, as test data.

The test condition setting unit 13 sets a test condition, which is a condition for the testing unit 14 to conduct a test. Examples of a test condition include the tolerance between a shape represented by test data and a shape represented by shape data obtained by converting the test data. The test condition setting unit 13 is optional and need not be provided if a test conducted by the testing unit 14 does not need any test condition.

The testing unit 14 conducts a test as to whether the difference between a shape represented by test data stored in the test data storage unit 11 and a shape represented by shape data obtained by converting this test data using the CAD software falls within the tolerance set by the test condition setting unit 13. At this time, if data indicating a list where the test case name of the test data to be tested is described (hereafter referred to as "test list") is stored in the list storage unit 19, the testing unit 14 conducts a test using test data corresponding to the test case name described in the test list stored in the list storage unit 19 out of pieces of test data stored in the test data storage unit 11. The testing unit 14 then outputs the test results and test time periods as associated with the corresponding test case names.

In a test conducted using the (n−1)th release of CAD software from the first release, based on the test results and test time periods outputted by the testing unit 14 as associated with the corresponding test case names, the test result analysis unit 15 updates the test result histories and test time period information which are stored in the test result storage unit 16 as associated with the corresponding test case names. In tests conducted using the n-th and later releases of CAD software, the test result analysis unit 15 analyses a test result which is outputted by the testing unit 14 as associated with a corresponding test case name and a test result history which is stored in the test result storage unit 16 as associated with that test case name. The test result analysis unit 15 then generates a group identifier as well as calculates a test result stability index and a module stability index. The test result analysis unit 15 then stores the group identifier, the test result stability index, and the module stability index in the test result storage unit 16 as associated with the test case name. Also, based on the test results and the test time periods outputted by the testing unit 14 as associated with the corresponding test case names, the test result analysis unit 15 updates the test result histories and the test time period information which are stored in the test result storage unit 16 as associated with that test case name. N is a predetermined natural number and represents the release number of the CAD software when the selection of a test case is performed for the first time. N is preferably 10 to 20. In this embodiment, the test case name and the test result history stored in the test result storage unit 16 as associated with each other are used as an example of test result information. The test result analysis unit 15 is provided as an example of an acquisition unit for acquiring test result information. Further, the test case name, the group identifier, the test result stability index, and the module stability index stored in the test result storage unit 16 as associated with each other are used as an example of group information. The test result analysis unit 15 is provided as an example of a group information generation unit for generating group information.

The test result storage unit 16 is a database for storing test case names, test result histories, group identifiers, test result stability indices, module stability indices, and test time period information as associated with each other. A test case name here refers to a name for identifying test data to be tested by the testing unit 14. A test result history here is an example of a test result string and refers to history information consisting of a release number and a corresponding test result. A release is an example of a version of CAD software. A group identifier is an example of group identification information and refers to information for identifying a group to which a corresponding test case belongs. A test result stability index is an example of test result stability information and refers to an index indicating the stability of the test result of a corresponding test case (an index indicating whether the test result is satisfactory). A module stability index is an example of module stability information and refers to an index indicating the stability of a module of CAD software to be tested in a corresponding test case (an index indicating whether a module has not frequently been changed). Test time period information refers to information indicating the time which has been taken to test a corresponding test case. Where multiple tests are conducted, the test time period information may be the average of the time periods taken by the respective tests or the time taken by the latest test.

The list creation condition setting unit 17 sets a condition for creating a test list (hereafter referred to as a "list creation condition"). Examples of the list creation condition include a limit on the number of test cases contained in a test list, a limit on the test time period of each test case contained in a test list, a first threshold, which is the lower threshold of a test result stability index used in selecting a test case in a test list, and a second threshold, which is the lower threshold of a module stability index used in selecting a test case in a test list.

The list creation unit 18 creates a test list in which the test case name of the test data selected as data to be tested is described, based on the test result stored in the test result storage unit 16 and the list creation condition set by the creation condition setting unit 17. In this embodiment, the list creation unit 18 is provided as an example of a list creation unit for creating a list and also as an example of a selection unit for selecting data.

The list storage unit 19 stores the test list created by the list creation unit 18.

Next, a process performed by the testing apparatus 10 according to this embodiment will be described in detail. First, the testing apparatus 10 first conducts a test using all CAD data. Even if it is desired to conduct a test using, for example, 3000 out of 50000 pieces of CAD data, the testing apparatus 10 conducts a test using the 50000 pieces as a preparation stage. Specifically, the test data input unit 12 inputs the 50000 pieces of CAD data as test data in the test data storage unit 11 together with test case names.

Subsequently, the testing apparatus 10 performs a process with respect to the first release of CAD software.

First, the testing unit 14 tests the first release of CAD software using the 50000 pieces of test data stored in the test data storage unit 11 and outputs the test results as associated with the corresponding test case names. Specifically, the testing unit 14 determines the difference between a shape represented by each test data and a shape represented by shape data obtained by converting the test data using the first release of CAD software. If the difference falls within the tolerance, the testing unit 14 outputs a test result "pass"; if the difference does not, it outputs a test result "fail". At this time, the testing unit 14 also outputs the test time periods as associated with the corresponding test case names.

The test result analysis unit 15 then stores the test results which are outputted by the testing unit 14 as associated with the corresponding test case names, in the test result storage unit 16 as test result histories corresponding to the test case names. It also stores the test time periods which are outputted by the testing unit 14 as associated with the corresponding test case names, in the test result storage unit 16 as test time period information corresponding to the test case names. Specifically, any test result history or test time information corresponding to the test case names has yet to be stored in the test result storage unit 16 at this time; therefore, the test results and the test time periods outputted by the testing unit 14 are stored therein as test result histories and pieces of test time period information as they are.

The list creation unit 18 then selects test cases falling within the number limit and the test time limit set by the creation condition setting unit 17 from among the test cases stored in the test result storage unit 16. It then creates a test list in which the test case names of the test cases selected are described. The list creation unit 18 then stores the created test list in the list storage unit 19.

Subsequently, the testing apparatus 10 performs a process with respect to the second release of CAD software.

First, the testing unit 14 tests the second release of CAD software using pieces of test data having the test case names described in the test list stored in the list storage unit 19 out of the 50000 pieces of test data stored in the test data storage unit 11. It then outputs the test results and test time periods as associated with the corresponding test case names. If pieces of test data are additionally inputted to the test data storage unit 11 by the test data input unit 12, the above-mentioned process is performed using the pieces of test data added also.

The test result analysis unit 15 then stores the test results which are outputted by the testing unit 14 as associated with the corresponding test case names, as contained in the test result histories which are stored in the test result storage unit 16 as associated with the corresponding test case names. It also updates the test time period information which are stored in the test result storage unit 16 as associated with the corresponding test case names, based on the test time periods which are outputted by the testing unit 14 as associated with the corresponding test case names.

Since the list creation unit 18 also uses the pieces of test data used in these tests as they are in the test of the third release of CAD software, it does not create a new test list.

Subsequently, the same process is repeated with respect to the third to (n−1)th releases of CAD software.

Hereafter, the data stored in the test result storage unit 16 at this time will be described.

FIG. 2 is a diagram showing an example of the data stored in the test result storage unit 16. Here it is assumed that n=10.

As shown, test result histories and pieces of test time period information are stored in the test result storage unit 16 as associated with the corresponding test case names. The release numbers and the test results corresponding to the first to ninth releases are stored as test result histories. In the parentheses, the left element represents the release number, and the right element represents the test result. "P" refers to "pass", and the "F" to "fail". In this stage, any group identifier has yet to be generated and any test result stability index or module stability index has yet to be calculated. For this reason, these fields are blank.

Subsequently, the testing apparatus 10 performs a process with respect to the n-th release of CAD software.

First, the testing unit 14 tests the n-th release of CAD software using pieces of test data having the test case names described in the test list stored in the list storage unit 19 out of the 50000 pieces of test data stored in the test data storage unit 11. It then outputs the test results and the test time periods associated with the corresponding test case names.

The test result analysis unit 15 then performs a test result analysis process on the basis of the test results outputted by the testing unit 14 and the test result histories stored in the test result storage unit 16.

Hereafter, this test result analysis process will be described in detail.

First, the test result analysis unit 15 performs a test case group determination process.

The test case group determination process is a process of determining a group to which each test case belongs by converting each test case into a character string.

FIG. 3 is a diagram showing an outline of the test case group determination process.

The diagram shows the test results obtained when the releases 1.1 to 4.0 of CAD software are tested using the test cases A to E, and the identifiers of the groups to which the test cases A to E belong. The diagram also shows the release date of each release. For the test result of each release, "pass" is represented by "○", "fail" by "x", and "unperformed" by a blank. Each group identifier is a character string consisting of "1" representing a test result "pass", "0" representing a test result "fail", and/or "2" representing a test result "unperformed". Since all test data is used in the test of the first release of CAD software, there is no possibility that any test case will not be performed. However, this diagram is only illustrative and shows an unperformed test case.

If test cases have the same group identifier, the test result analysis unit 15 regards the test cases as belonging to the same group. In this diagram, the test cases C and D have the same group identifier, "0000011111". This means that these test cases belong to the same group. The group to which each test case belongs is determined in this way and then it is considered to select a test case by group.

In this embodiment, it is assumed that if multiple test cases have the same group identifier, these test cases belong to the same group. Alternatively, if multiple test cases have similar group identifiers, for example, if the square sum of the difference between the characters of the group identifiers of test cases falls within a threshold, these test cases may be regarded as belonging to the same group.

The test result analysis unit 15 then performs a test case priority determination process.

The test case priority determination process is a process of, in the selection of a test case, giving higher priority to a test case requiring to be selectively tested, such as unstable test cases. Thus, such a test case is selectively left. As a result, test cases are comprehensively selected. The test case priority determination process is performed if the correlation between a test case used in a test and a module of the CAD software is unknown or if the investigation of such correlation takes much work.

Specifically, the test result analysis unit 15 grasps the stability of each test case from the test result histories of each test case. Information to be noted in the test result histories of each test case is the stability of the test case at this point in time, as well as the stability of a module to be tested. This is because even if the current test result is satisfactory to some extent, a module whose function is frequently changed needs to be more selectively tested.

For this reason, the test result analysis unit 15 calculates the two indices, the test result stability index and the module stability index, in the determination of the stability of a test case.

FIGS. 4(*a*) to 4(*c*) are diagrams showing steps for calculating a test result stability index.

FIG. 4(*a*) shows the test results obtained when the releases 1.1 to 4.0 of CAD software are tested using the test cases A to C and pass dates indicating the dates of releases which have continued to the current one and whose test result is "pass". Of the test results in the diagram, the test results of the releases 1.1 to 3.0 are stored in the test result storage unit 16, and the test results of the release 4.0 are outputted by the testing unit 14.

In FIG. 4(*b*), the test results "○" and "x" of FIG. 4(*a*) are each replaced with a continuous pass number representing the number of continuous dates when the test result is "pass". Specifically, if the test result of the release 1.1 is "○", the continuous pass number is set to "1"; if the test result is "x", the continuous pass number is set to "0". For the later releases, if the test result is "○", the continuous pass number is set to the continuous pass number of the preceding release plus 1; if the test result is "x", the continuous pass number is set to "0." Thus, the continuous pass number of the release 4.0 represents the test result stability at the present time. Its value is "10" for the test case A, "5" for the test case B, and "5" for the test case C. In this embodiment, the continuous pass number is the number of dates which have continued to the current date and whose test result is "pass". Alternatively, it may be the number of test results which have continuously been "pass" to the present time.

However, both the value representing the stability of test results which have all been "pass" thus far, such as that of the release 2.1 of the test case A, and the value representing the stability of the test result which has once been "fail" thus far, such as that of the release 4.0 of the test case B, would be the same value, "5". For this reason, in this embodiment, the continuous pass number is normalized to calculate a test result stability index.

FIG. 4(*c*) shows the results obtained by normalizing the continuous pass numbers.

Specifically, the continuous pass number of a certain release in FIG. 4(*b*) is divided by the number of releases up to that release. Thus, a test result stability index between 0 and 1 is calculated.

For example, the test result stability index of the current release, that is, the tenth release is 1 (=10/10) for the test case name A, 0.5 (=5/10) for the test case name B, and 0.5 (=5/10) for the test case name C.

While the test result stability index is calculated based on the number of passes continuing from a certain release to the latest release in the following description also, it may be calculated using other methods.

For example, the test result stability index may be calculated based on the number of passes continuing from a certain release to any release other than the latest one.

Alternatively, rather than based on the number of test results which have continuously been "pass", the test result stability index may be calculated simply based on the number of test results which have simply been "pass" and, more generally, based on the occurrence situation of a test result indicating success.

FIGS. 5(*a*) and 5(*b*) are diagrams showing steps for calculating a module stability index.

FIG. 5(*a*) shows the test results obtained when the releases 1.1 to 4.0 of CAD software are tested using the test case names A to C.

In FIG. 5(*b*), the test results "○" and "x" of FIG. 5(*a*) are each replaced with variation data indicating the presence or absence of a variation in test result. Even if test cases have continuous test results "pass" having the same length, it is desirable to select a test case related to a more stable module. For this reason, the variation pattern of "pass" and "fail" is obtained based on the test results. In this example, if the test result is the same as that of the preceding release, the variation data is set to "1"; if the test result differs from that of the preceding release, the variation data is set to "0". It is noted that module stability index for the first release 1.1 is 1, because the test result at the first release has not been changed from the test result at a prior release.

Meanwhile, it can be said that, in the selection of a test case, greater importance is placed on a variation in test result at a time close to the present time than on a variation in test result at a time distant from the present time.

For this reason, a weighing function for making a weight larger as the release date is closer to the present date is set. Then, variation data at each release date is multiplied by a weight of each release date obtained using a weighting function, and the sum of the values obtained is defined as the module stability index.

Figure 6:
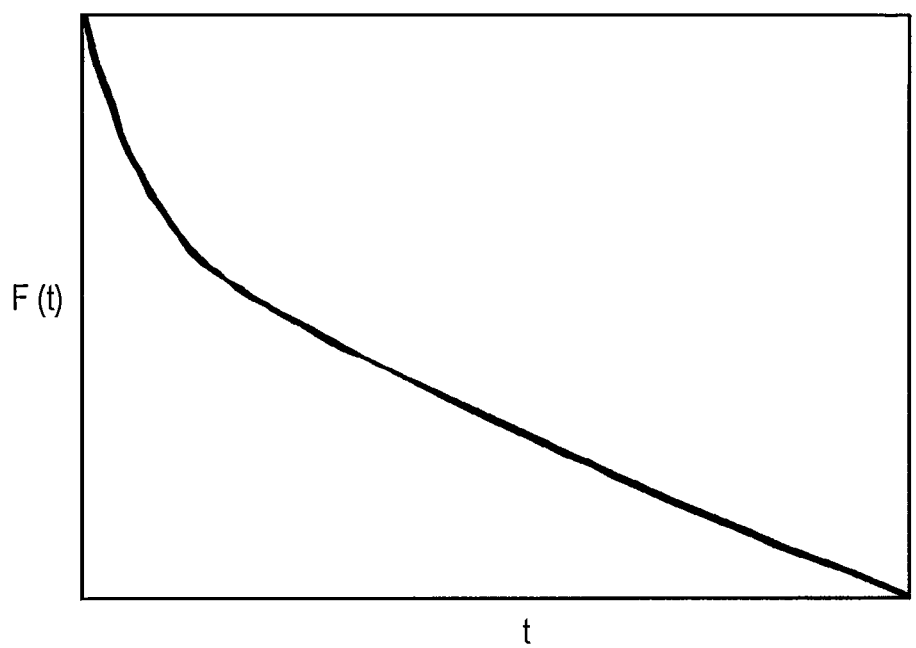
FIG. 6 is a graph showing an example of a weighting function used to calculate a module stability index according to embodiments of the present invention.

FIG. 6 is a graph showing an example of such a weighting function.

In this graph, the horizontal axis t represents the difference between the present date and the release date, and the vertical axis F(t) represents a weight assigned to the difference t.

A module stability index M is calculated by $M = \Sigma F(t) \times V(t)$ where V(t) represents variation data corresponding to the difference t.

For example, assume that $F(t) = (R-t)/\Sigma t$ where R represents the number of releases. In the example of FIG. 5, R=10 and $\Sigma t = 1+2+3+4+ \ldots +10 = 55$. Accordingly, $F(t) = (10-t)/55$.

Accordingly, the module stability index with respect to the test case A is $1 (=(1/55) \times 1 + (2/55) \times 1 + (3/55) \times 1 + (4/55) \times 1 + (5/55) \times 1 + (6/55) \times 1 + (7/55) \times 1 + (8/55) \times 1 + (9/55) \times 1 + (10/55) \times 1)$. The module stability index with respect to the test case B is $0.8 (=(1/55) \times 1 + (2/55) \times 1 + (3/55) \times 1 + (4/55) \times 1 + (5/55) \times 0 + (6/55) \times 0 + (7/55) \times 1 + (8/55) \times 1 + (9/55) \times 1 + (10/55) \times 1)$. The module stability index with respect to the test case C is $0.89 (=(1/55) \times 1 + (2/55) \times 1 + (3/55) \times 1 + (4/55) \times 1 + (5/55) \times 1 + (6/55) \times 0 + (7/55) \times 1 + (8/55) \times 1 + (9/55) \times 1 + (10/55) \times 1)$.

In the following description also, the module stability index is calculated by summing up results obtained by adding a weight corresponding to novelty of each release to variation data corresponding to each release. However, the module stability index may be calculated using other methods.

For example, rather than adding a weight corresponding to the novelty of each release, the module stability index may be calculated simply based on the number of pieces of variation data "1" and, more generally, based on the variation situation of the test result.

Next, the above-mentioned test result analysis process performed by the test result analysis unit 15 will be described with reference to a flowchart.

Figure 7:
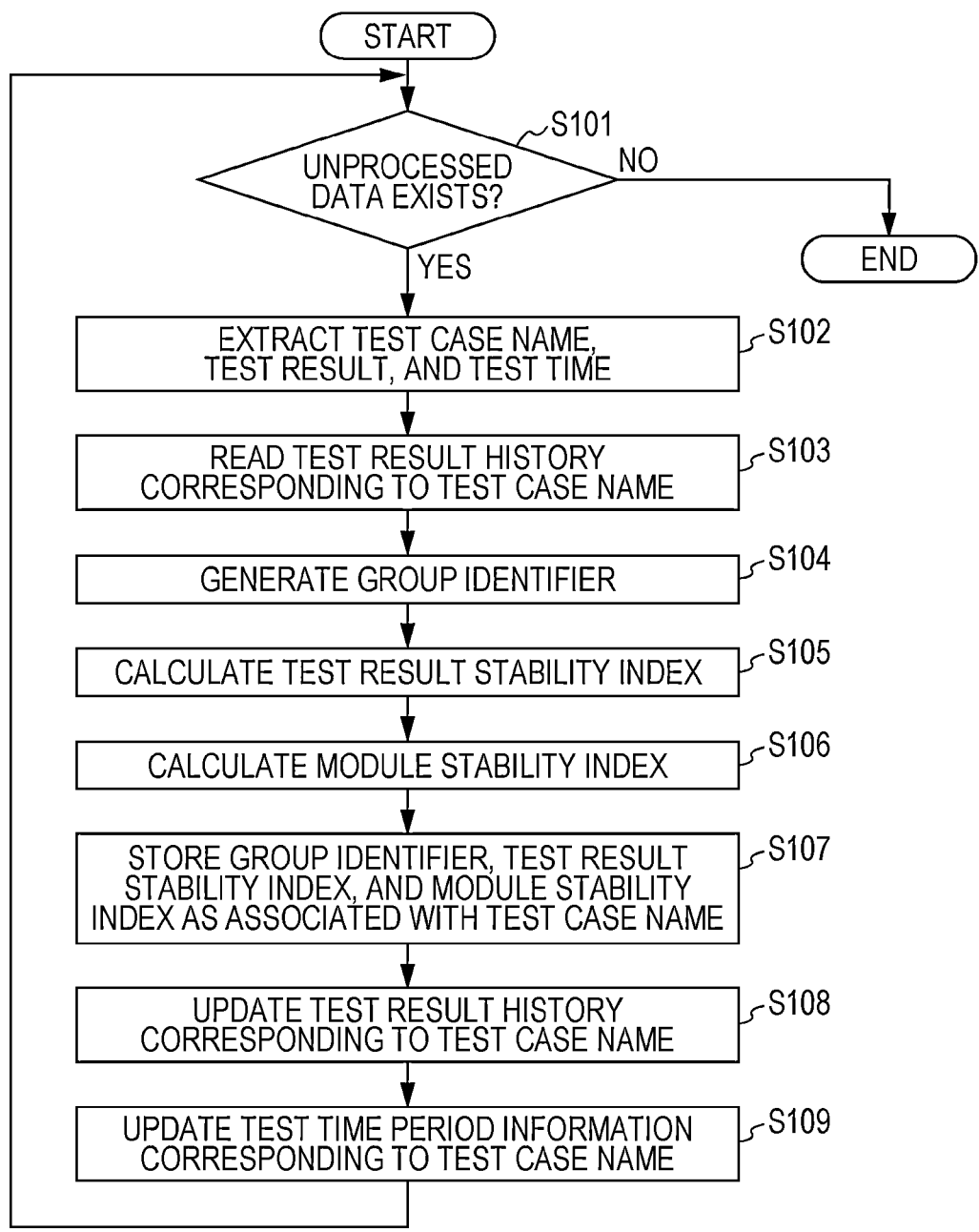
FIG. 7 is a flowchart showing a process example performed by a test result analysis unit according to embodiments of the present invention.

FIG. 7 is a flowchart showing a process example performed by the test result analysis unit 15 with respect to the n-th release of CAD software. In an attempt to incorporate into this flowchart processes performed by the test result analysis unit 15 with respect to the first to (n−1)th releases of CAD software, it is preferable to provide at the top of the flowchart a step of determining with respect to what release of CAD software the process is. If the process is determined in that step to be a process with respect to any of the first to (n−1)th releases of CAD software, the test result analysis unit 15 preferably only stores the test results and the test time periods outputted by the testing unit 14 in the test result storage unit 16. If the process is determined in that step to be a process with respect to the n-th release of CAD software, it preferably performs the illustrated process.

First, the test result analysis unit 15 determines whether the data outputted by the testing unit 14 contains unprocessed data (step 101). If unprocessed data is determined not to be present, the process completes. If unprocessed data is determined to be present, the test result analysis unit 15 extracts, and thus receives, from the data a set of a test case name, a test result, and test time (step 102) for the n-th release being processed for the software. The test result for the test case (of multiple test cases) currently being processed for a test performed for each release of multiple releases of the software is a first character string denoting a pass status for the test, a second character string denoting a fail status for the test, or a third character string for the test denoting that the test has not been performed, as illustrated in FIG. 3 described supra in which the first, second, and third character strings are "○", "x", and a blank character, respectively.

The test result analysis unit 15 then reads a test result history which is stored in the test result storage unit 16 as associated with the corresponding test case name (step 103).

The test result analysis unit 15 then creates a group identifier, based on the test result extracted in step 102 and the test result history read in the step 103 (step 104). Specifically, the test result analysis unit 15 generates a character string by analyzing the test result history read in step 103 and converting a test result "pass" into a character "1", and/or converting a test result "fail" into a character "0". The test result analysis unit 15 then generates a group identifier by referring to the test result extracted in step 102 and adding a character "1" to the end of that character string if the test result is "pass" or adding a character "0" to the end of that character string if the test result is "fail". Thus, step 104 determines a group identifier of a group for the test case (of multiple test cases) currently being processed, wherein the group identifier for the test case is a group character string determined from the test results of the tests performed for all releases of the multiple releases for the test case. For the preceding example, FIG. 8 illustrates the group character strings for the test cases A, B, and C which includes characters of "1" and "0" which are respectively derived from the corresponding character strings "○" and "x" in FIG. 3. Accordingly, the group character string pertaining to the group identifier of each group is a set of single characters sequenced in a sequential order in which the multiple releases of the software are sequenced in a time ordering of the releases, and wherein each single character in the set of single characters has been mapped from the first, second, or third character string that denotes the pass status, the fail status, or the unperformed status, respectively, of the test result for the release of the multiple releases corresponding to a position of the release in the time ordering of the releases. As depicted in FIG. 3, the first, second, and third character strings of "○", "x", and the blank character have been respectively mapped into the single characters of "1", "0", and "2".

The test result analysis unit 15 then calculates a test result stability index, based on the test result extracted in step 102 and the test result history read in the step 103 (step 105). Specifically, the test result analysis unit 15 refers to the test result extracted in step 102 and sets the continuous pass number to "1" if the test result is "pass" or sets it to "0" if the test result is "fail". Where the continuous pass number is "1", the test result analysis unit 15 analyzes the test result history read in step 103 and adds the number of "passes" continuing from the test result of the preceding release to the continuous pass number. The test result analysis unit 15 then calculates a test result stability index by dividing the continuous pass number at this point in time by the number of releases. Thus, the test result stability index for each release (R) of each test case is computed as equal to $T_R/N_R$, wherein $T_R$ is a total number of consecutive releases including and prior to said each release (R) for which the test result is the first character string denoting the pass status, wherein $N_R$ is a total number of releases including and prior to said each release (R) starting with the first release of the multiple releases.

Accordingly, the test result stability index for the test case currently being processed is calculated as being proportional to a total number of consecutive releases that include and are prior to the last release of the multiple releases of the software such that the test result for each release of the consecutive releases is the first character string denoting the pass status (e.g., the first character string of "○" depicted in FIG. 4(*b*) for the latest release 4.0 as 10, 5, and 5 for test case A, B, and C, respectively, or in FIG. 4(*c*) in the normalized form a 1, 0.50, and 0.50 for test case A, B, and C, respectively). More specifically, calculating the test result stability index the test case currently being processed consists of said computing the test result stability index for the last release of the multiple releases for the test case being processed, such that $T_R$ pertains to the last release of the multiple releases for the test case being processed and $N_R$ is equal to the total number of releases of the multiple releases.

The test result analysis unit 15 then calculates a module stability index, based on the test result extracted in step 102 and the test result history read in step 103 (step 106). Specifically, the test result analysis unit 15 analyzes the test result history read in step 103, sets variation data corresponding to the first release to "1". For variation data corresponding to the second to the preceding releases, the test result analysis unit 15 sets it to "1" if the test result is the same as the preceding test result; it sets it to "0" if the test result differs from the preceding test result. The test result analysis unit 15 also refers to the test result extracted in step 102. The test result analysis unit 15 then sets variation data corresponding to the current release to "1" if the test result is the same as the preceding test result; it sets the variation data to "0" if the test result differs from the preceding test result. The test result analysis unit 15 then multiplies the variation data corresponding to each release by the weighting function F(t), as shown in FIG. 6, where t represents the difference between the release date of each release and the release date of the current release.

It then sums up the resulting values to calculate a module stability index. If the release date of each release is not stored in the test result histories unlike in FIG. 2, the test result analysis unit 15 may obtain them from a database for controlling the release of CAD software, using the release number as a key. Alternatively, the release dates may previously be stored in the test result histories and then obtained therefrom. Thus, step 106 calculates the module stability index for each test case as being a summation over a product of a weight at each release and a binary stability indicator of 0 at each release for which the test result is changed from the test result at the immediately prior release and 1 at every other release, as discussed supra in conjunction with FIGS. 5(b) and 6. In one embodiment, the weight at each release after the first release exceeds the weight at each other release that is prior to said each release.

The test result analysis unit 15 then stores the group identifier, the test result stability index, and the module stability index in the test result storage unit 16 (which is a hardware storage unit) as associated with the test case name extracted in step 102 (step 107). If a group identifier, a test result stability index, and a module stability index are already stored, the test result analysis unit 15 overwrites them with the new ones. Thus, after the test result stability index has been calculated for all of the releases of the software for a given test case, the only test result stability index that is stored in the test result storage unit 16 for the given test case is the test result stability index for the latest release of the software since the test result stability index of the other releases have been overwritten. Consequently, the given test case is characterized by the test result stability index for the latest release of the multiple releases of the software as illustrated in FIG. 8 for the 4.0 release shown in FIG. 4(c).

The test result analysis unit 15 then stores the test result extracted in step 102 in the test result history which is stored in the test result storage unit 16 as associated with the test case name extracted in step 102 (step 108).

The test result analysis unit 15 also updates the test time period information which is stored in the test result storage unit 16 as associated with the test case name extracted in step 102, based on the test time extracted in step 102 (step 109).

The test result analysis unit 15 then returns to step 101 and repeats steps 102 to 109 until any unprocessed data is determined not be present.

Hereafter, the data stored in the test result storage unit 16 at this point in time will be described.

FIG. 8 is a diagram showing an example of the data stored in the test result storage unit 16. Again assume that n=10.

As shown, test result histories and pieces of test time period information are stored in the test result storage unit 16 as associated with the corresponding test case names. For the test result histories, the release number and the test result are stored with respect to each of the first to tenth releases. A group identifier, a test result stability index, and a module stability index are also stored as associated with the corresponding test case names.

Subsequently, the list creation unit 18 selects test cases and creates a new test list, based on the information stored in the test result storage unit 16. Specifically, the list creation unit 18 selects a test case in a group having a test result stability index and a module stability index exceeding the respective thresholds out of the groups having the group identifiers stored in the test result storage unit 16. At this time, the list creation unit 18 selects a single test case from among the test cases belonging to the group, based on the test time period. For example, test cases having a long test time period are selectively excluded from the test cases belonging to the group, so that a test case having a shortest time period of the test cases in the group is the selected single test case from the group.

FIG. 9 is a diagram showing such test case selection.

The diagram shows the group test result stability index, the group module stability index, and the test case count (simply described as "count" in the diagram) for each of group identifiers when tests are conducted using 2443 pieces of test data. The count is the total number of test case in the group having the indicated group identifier.

For each group having a count of 1, the group test result stability index and the group module stability index for the group are the same as the test result stability index and the module stability index, respectively, for the one test case in the group.

For each group having a count of at least two, the group test result stability index and the group module stability index for the group are derived from the test result stability index and the module stability index, respectively, for the at least two test respective cases in the group having the same group identifier.

In one embodiment in which the count is at least two for a group, the group test result stability index and/or group module stability index for the group is the maximum test result stability index and/or module stability index, respectively, of the test cases included in the group.

In one embodiment in which the count is at least two for a group, the group test result stability index and/or group module stability index for the group is the minimum test result stability index and/or module stability index, respectively, of the test cases included in the group. In one embodiment in which the count is at least two for a group, the group test result stability index and/or group module stability index for the group is the arithmetic average of the test result stability index and/or module stability index, respectively, of the test cases included in the group.

Here assume that a first threshold is 0.35 and a second threshold is 0.8. Then assume that if the group test result stability index of a certain group exceeds 0.35 and the group module stability index thereof exceeds 0.8, a single test case is selected from among the test cases in the group. In the diagram, the groups having a test result stability index exceeding 0.35 and a module stability index exceeding 0.8 are given a determination "TRUE", and the other groups a determination "FALSE". If the count of the test cases of a group which is given a determination "TRUE" is "1", the one test case in the group is selected, as depicted in FIG. 9 for all groups having a count of 1. A single test case is selected with respect to the groups having a count of "2" or more. That is, the test cases belonging to the groups that have a count of "2" or more and that are given a determination "TRUE" are excluded from test cases to be included in the test list, except for one test case.

For a group having a group test result stability index and a group module stability index which are both "1", the test result is stable. However, it is difficult to determine that the test cases belonging to the group are related to the same module. Accordingly, these test cases are selected in this embodiment, as illustrated in the first row in FIG. 9 which shows all 2189 test cases selected with a group test result stability index and a group module stability index both having a value of "1" for the group.

For a group having a test result stability index of "0" and a module stability index of "1", the test cases are all represented by "fail". Accordingly, the test cases are selected in this embodiment, as illustrated in the last row in FIG. 9 which shows 2 test cases selected with a group test result stability index of "0" and a group module stability index of "1" for the group.

The diagram also shows the number of test cases obtained after each group undergoes such selection (simply described as "selected" in the diagram). Altogether, 2443 test cases are organized into 2226 cases, which means about a 8.9% reduction.

Next, a process performed by the list creation unit 18 in the above-mentioned test list creation process will be described with reference to a flowchart.

Figure 10:
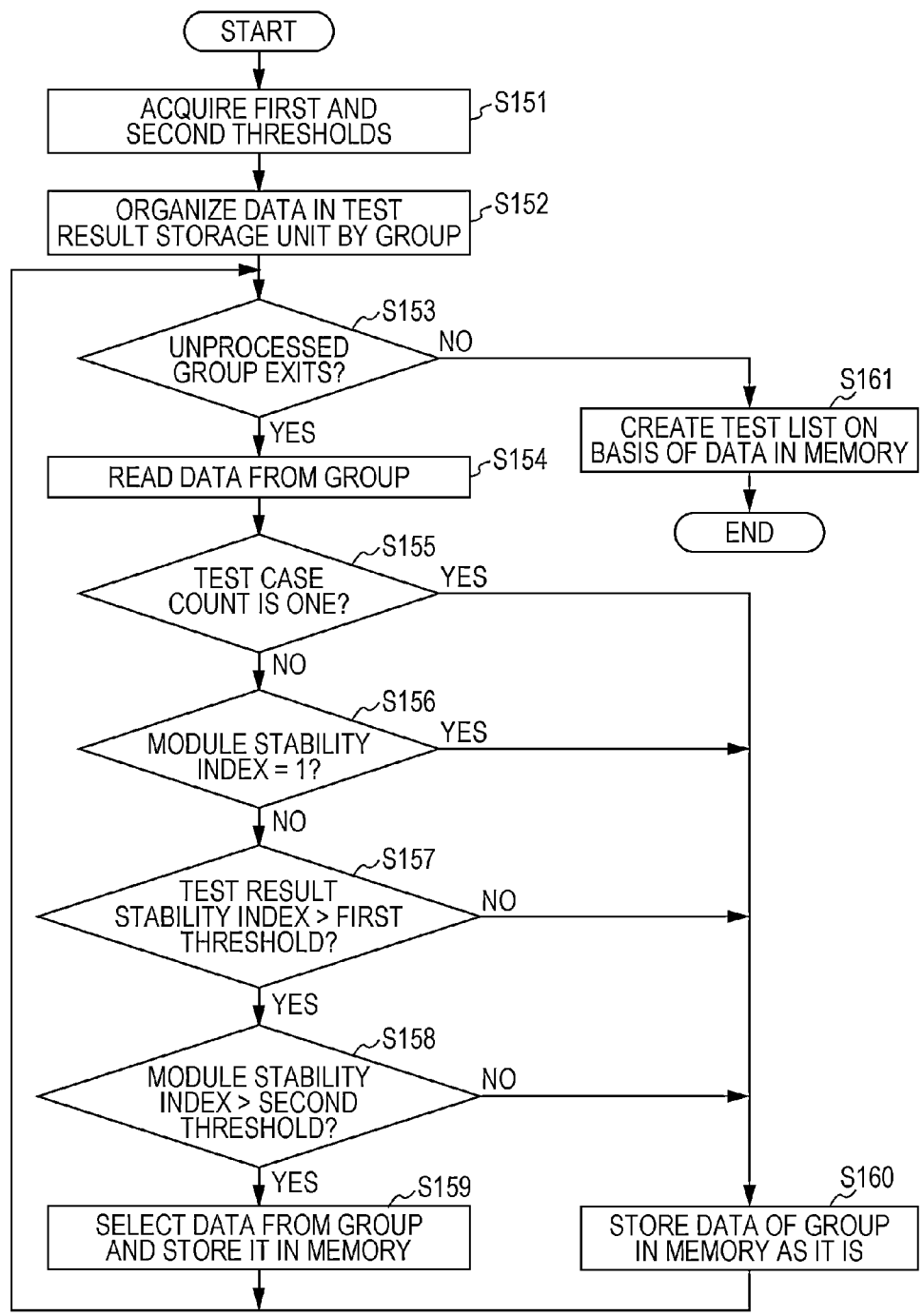
FIG. 10 is a flowchart showing a process example performed by a list creation unit according to embodiments of the present invention.

FIG. 10 is a flowchart showing an process example performed by the list creation unit 18 with respect to the n-th release of CAD software. In an attempt to incorporate processes performed by the list creation unit 18 with respect to the first to (n−1)th releases of CAD software into this flowchart, it is preferable to provide at the top of the flowchart a step of determining with respect to what release of CAD software the process is. If the process is determined in that step to be a process performed with respect to the first release of CAD software, the list creation unit 18 preferably only creates a test list where test cases falling with the limits of the test case count and test time period by the creation condition setting unit 17 are described. If the process is determined in that step to be a process performed with respect to any of the second to the (n−1)th releases of CAD software, the list creation unit 18 preferably skips all processes. If the process is determined in that step to be a process performed with respect to the n-th release of CAD software, the list creation unit 18 preferably performs the process shown in the diagram.

First, the list creation unit 18 obtains the respective thresholds of the group test result stability index and the group module stability index set by the creation condition setting unit 17, first and second thresholds (step 151).

The list creation unit 18 then temporarily organizes the data stored in the test result storage unit 16 by group (step 152). Specifically, the list creation unit 18 organizes data of test cases associated with the same group identifier.

The list creation unit 18 then determines whether any unprocessed groups are present among the groups stored in the test result storage unit 16 (step 153). If any unprocessed groups are determined to be present, the list creation unit 18 reads data of one of the groups (step 154).

The list creation unit 18 then determines whether the number of test cases contained in the read data of the group is one (step 155). If the number of test cases is determined to be one, the one test case in the group is selected, as depicted in FIG. 9 in which the one test case is shown to be selected for all groups having a count of 1. Accordingly, the list creation unit 18 stores the read data as it is (step 160).

If the number of test cases is determined not to be one, the list creation unit 18 determines whether the module stability index contained in the read data of the group is "1" (step 156). If the group module stability index is determined to be "1", the test results of the test cases belonging to this group would continuously be the same. Accordingly, the test cases are selected, as illustrated in the first and last rows in FIG. 9 which show all 2189 test cases in the first row and the 2 test cases in the last row selected for groups having a group module stability index of "1". As a result, the list creation unit 18 stores the read data in the memory as it is (step 160).

If the module stability index is determined not to be "1", the list creation unit 18 determines whether the test result stability index contained in the read data of the group exceeds the first threshold obtained in step 151 (step 157). If the test result stability index is determined not to exceed the first threshold, the test results of the test cases belonging to this group are determined not to be stable and therefore all test cases in this group are selected, as illustrated in FIG. 9 which shows all test cases being selected in groups having a group test result stability index not exceeding the first threshold of 0.35. As a result, the list creation unit 18 stores the read data in the memory as it is (step 160).

If the group test result stability index is determined to exceed the first threshold, the list creation unit 18 determines whether the module stability index contained in the read data of the group exceeds the second threshold obtained in step 151 (step 158). If the group module stability index is determined not to exceed the second threshold, the module related to the test cases belonging to this group is determined to have frequently been changed and therefore all test cases in the group are selected. As a result, the list creation unit 18 stores the read data in the memory as it is (step 160).

If the group module stability index is determined to exceed the second threshold, the list creation unit 18 eliminates all test cases contained in the read data of the group except for a test case which is the shortest in test time and stores the remaining data in the memory (step 159).

The test result analysis unit 15 then returns to step 153 and repeats steps 154 to 160 until no unprocessed group is determined to be present.

If no unprocessed group is determined in step 153 to be present, the list creation unit 18 creates a test list having therein the test case names contained in the data stored in the memory in step 159 or step 160 and stores the test list in the list storage unit 19 (step 161).

In this process example, if a group meets all of a first condition that the module stability index is not "1", a second condition that the test result stability index exceeds the first threshold, and a third threshold that the module stability index exceeds the second threshold, a single test case is selected from among the test cases in the group. However, the conditions are not limited to the above-mentioned ones.

For example, the first condition may be excluded from the conditions to be considered in this test list creation process.

For the second and third conditions, satisfaction of both conditions need not necessarily be required and satisfaction of either one may be required.

Rather than being separate conditions, the second and third conditions may be organized into a single condition that "test case importance" calculated by first weighting factor×test result stability index+second weighting factor×module stability index exceeds a threshold.

In this process example, when data of a group meets the conditions, the list creation unit 18 simply eliminates all test cases in the group except for one. Alternatively, after eliminating the test cases, the list creation unit 18 may add test cases which have been tested separately and whose test result is "fail" or test cases related to a new function or important portion. In this case, the list creation unit 18 preferably adds test data falling within the limits of the test case count and test time period by the creation condition setting unit 17.

At this time, to know how much time is left until reaching the test time limit set by the creation condition setting unit 17, the list creation unit 18 may calculate an estimated total time which would be taken when tests are conducted based on all test cases contained in the test list.

This completes the description of the process performed with respect to the n-th release of CAD software.

Subsequently, the same process is repeated with respect to the (n+1)th and later releases of CAD software.

As seen, this embodiment provides the database for storing the execution results of the test cases (releases and test results) based on the past bug histories of the user. Further, this embodiment automatically assigns priorities to the test cases on the basis of the data stored in this database, determining the application conditions of the test cases.

Specifically, first, attention is paid to the correlation between the execution results of the test cases based on the past bug histories of the user, and the module and function used by the test cases are determined based on this correlation. Specifically, the degree of matching between the test results based on multiple test cases is calculated, and if the matching degree is equal to or greater than a threshold, these multiple test cases are determined to be related to the same module, and then selected.

Second, attention is paid to the chronological occurrence pattern of a test case for each release based on the test cases based on the past bug histories of the user; an index indicating the stability of the module related to each test case is calculated based on the release and the test result of each test case; and if the index is no less than a threshold, the test case is determined to be stable and then selected.

In this way, according to this embodiment, it is possible to select optimum test cases under the limits and conduct optimized tests.

Figure 11:
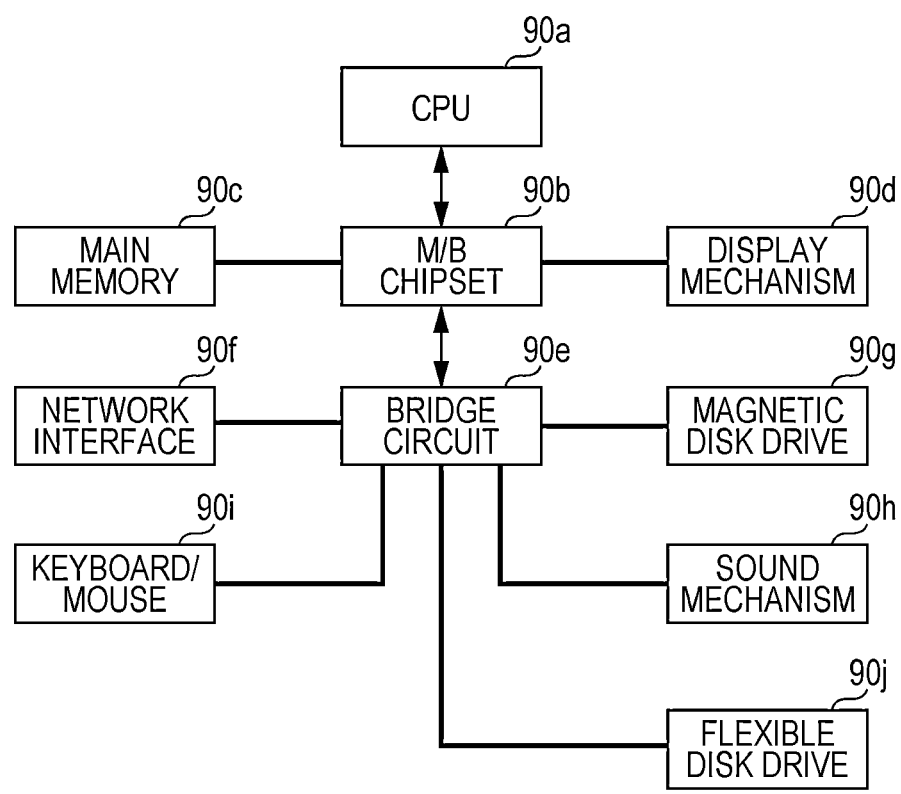
FIG. 11 is a diagram showing a computer hardware configuration to which embodiments of the present invention are applicable.

Finally, a computer hardware configuration of a computer system to which this embodiment is suitably applied will be described. FIG. 11 is a diagram showing an example of such a computer hardware configuration. As shown, the computer includes a central processing unit (CPU) 90a serving as calculation means, a main memory 90c connected to the CPU 90a via a motherboard (M/B) chipset 90b, and a display mechanism 90d connected to the CPU 90a via the M/B chipset 90b as well. Connected to the M/B chipset 90b via a bridge circuit 90e is a network interface 90f, a magnetic disk drive (HDD) 90g, a voice mechanism 90h, a keyboard/mouse 90i, and a flexible disk drive 90j.

In FIG. 11, the components are connected together via a bus. For example, the CPU 90a and the M/B chipset 90b, as well as the M/B chipset 90b and the main memory 90c are connected together via a CPU bus. The M/B chipset 90b and the display mechanism 90d may be connected together via an accelerated graphics port (AGP). However, where the display mechanism 90d includes a PCI Express-compliant video card, the M/B chipset 90b and this video card are connected together via a PCI Express (PCIe) bus. The network interface 90f may use, for example, PCI Express to connect with the bridge circuit 90e. The magnetic disk drive 90g may use, for example, serial AT Attachment (ATA), parallel transfer ATA, and Peripheral Components Interconnect (PCI). The keyboard/mouse 90i and the flexible disk drive 90j may use Universal Serial Bus (USB).

The present invention as a whole may be realized as hardware or as software. Alternatively, the invention may be realized as both hardware and software. Specifically, the present invention may be realized as a computer, a data processing system, or a computer program comprising program code. Such a computer program (i.e., program code) may be stored in a physically tangible (e.g. hardware) computer-readable medium or device (e.g., disk drive 90g or 90j) and provided. Conceivable examples of such a medium or device include electronic, magnetic, optical, and electromagnetic media, infrared and semiconductor systems (apparatuses). Examples of the computer-readable media include semiconductors, solid-state storage devices, magnetic tapes, detachable computer diskettes, random access memory (RAM), read-only memory (ROM), rigid magnetic disks, and optical disks. Examples of the optical disk at the present time include compact disc-read only memory (CD-ROM), compact disc-read/write (CD-R/W), and DVD. Thus, a computer program product, of the present invention may comprise a computer readable hardware storage medium or device (e.g., disk drive 90g or 90j) having a computer readable program code stored therein, said program code configured to be executed by a processor (e.g., CPU 90a) of a computer system to implement the methods disclosed by the present invention (e.g., a method for processing test results from testing operation of software).

In addition, a computer system of the present invention may comprise a processor (e.g., CPU 90a), a memory (e.g., main memory 90c) coupled to the processor, and a computer readable storage device (e.g., disk drive 90g or 90j) coupled to the processor, wherein the storage device contains program code configured to be executed by the processor via the memory to implement the methods of the present invention.

While the present invention has been described using the embodiment, the technical scope of the invention is not limited thereto. It will be apparent for those skilled in the art that various changes can be made to the embodiment or alternative embodiments can be used without departing from the spirit and scope of the invention.

What is claimed is:

1. A computer system comprising a processor, a memory coupled to the processor, and a computer readable storage device coupled to the processor, said storage device containing program code configured to be executed by the processor via the memory to implement a method for processing test results from testing operation of software, said method comprising:

receiving, by said processor, a test result for each test case of multiple test cases for a test performed for each release of multiple releases of the software, said test result for each test for each release being a first character string denoting a pass status for the test, a second character string denoting a fail status for the test, or a third character string denoting an unperformed status for the test indicating that the test has not been performed;

ascertaining, by said processor, a group to which each test belongs, said ascertaining comprising determining a group identifier of the group to which each test belongs, said group identifier for each test case being a group character string determined from the test results of the tests performed for all releases of the multiple releases for said each test case, said ascertained groups consisting of multiple groups, each group of at least one group of the multiple groups comprising at least two test cases of the multiple test cases;

calculating, by said processor, a test result stability index for each test case as being proportional to a total number of consecutive releases that include and are prior to the last release of the multiple releases of the software such that the test result for each release of the consecutive releases is the first character string denoting the pass status;

calculating, by said processor, a module stability index for each test case as being a summation over a product of a weight at each release and a binary stability indicator of 0 at each release for which the test result is changed from the test result at the immediately prior release and 1 at every other release; and for each test case, storing, by said processor, the group identifier, the test result stability index, and the module stability index in a hardware storage unit of the computer system.

2. The computer system of claim 1, wherein the group character string pertaining to the group identifier of each group is a set of single characters sequenced in a sequential order in which the multiple releases of the software are sequenced in a time ordering of the releases, and wherein each single character in the set of single characters has been mapped from the first, second, or third character string that denotes the pass status, the fail status, or the unperformed status, respectively, of the test result for the release of the multiple releases corresponding to a position of the release in the time ordering of the releases.

3. The computer system of claim 1, wherein the method comprises:
   computing, by said processor, the test result stability index for each release (R) of each test case as being equal to $T_R/N_R$, wherein $T_R$ is a total number of consecutive releases including and prior to said each release (R) for which the test result is the first character string denoting the pass status, wherein $N_R$ is a total number of releases including and prior to said each release (R) starting with the first release of the multiple releases, and wherein said calculating the test result stability index for each test case consists of said computing the test result stability index for the last release of the multiple releases for said each test case.

4. The computer system of claim 1, wherein the weight at each release after the first release exceeds the weight at each other release that is prior to said each release.

5. The computer system of claim 1, wherein the method further comprises:
   for each group of the multiple groups, determining, by said processor, a group test result stability index from the test result stability indexes of the test cases belonging to said each group;
   for each group of the multiple groups, determining, by said processor, a group module stability index from the test result stability indexes of the test cases belonging to said each group;
   selecting, by said processor, a plurality of test cases from the multiple test cases such that the plurality of test cases consist of fewer test cases than the multiple test cases, said selecting the plurality of test cases being based on both the determined group test result stability index and the determined group module stability index of all groups of the multiple groups.

6. The computer system of claim 1, wherein said selecting the plurality of test cases comprises:
   receiving, by said processor, a specification of both a group test result stability index threshold and a group module stability index threshold;
   for each group, determining, by said processor, whether a condition is satisfied, said condition selected from the group consisting of the group test result stability index not exceeding the specified test result stability index threshold, the group module stability index not exceeding the specified group module stability index threshold, and a combination thereof;
   for each group for which the condition is determined to be satisfied, selecting, by said processor, only a single test case from said each group to be included in the plurality of test cases, wherein the selected single test case has a shortest time period of the test cases in the group;
   for each group for which the condition is determined to not be satisfied, selecting, by said processor, all test cases from said each group to be included in the plurality of test cases.

7. The computer system of claim 6, wherein the condition is determined to be satisfied for one or more groups of the multiple groups.

8. The computer system of claim 6, wherein the condition is determined to not be satisfied for one or more groups of the multiple groups.

9. A computer program product, comprising a computer readable hardware storage device having a computer readable program code stored therein, said program code configured to be executed by a processor of a computer system to implement a method for processing test results from testing operation of software, said method comprising:
   receiving, by said processor, a test result for each test case of multiple test cases for a test performed for each release of multiple releases of the software, said test result for each test for each release being a first character string denoting a pass status for the test, a second character string denoting a fail status for the test, or a third character string denoting an unperformed status for the test indicating that the test has not been performed;
   ascertaining, by said processor, a group to which each test belongs, said ascertaining comprising determining a group identifier of the group to which each test belongs, said group identifier for each test case being a group character string determined from the test results of the tests performed for all releases of the multiple releases for said each test case, said ascertained groups consisting of multiple groups, each group of at least one group of the multiple groups comprising at least two test cases of the multiple test cases;
   calculating, by said processor, a test result stability index for each test case as being proportional to a total number of consecutive releases that include and are prior to the last release of the multiple releases of the software such that the test result for each release of the consecutive releases is the first character string denoting the pass status;
   calculating, by said processor, a module stability index for each test case as being a summation over a product of a weight at each release and a binary stability indicator of 0 at each release for which the test result is changed from the test result at the immediately prior release and 1 at every other release; and
   for each test case, storing, by said processor, the group identifier, the test result stability index, and the module stability index in a hardware storage unit of the computer system.

10. The computer program product of claim 9, wherein the group character string pertaining to the group identifier of each group is a set of single characters sequenced in a sequential order in which the multiple releases of the software are sequenced in a time ordering of the releases, and wherein each single character in the set of single characters has been mapped from the first, second, or third character string that denotes the pass status, the fail status, or the unperformed status, respectively, of the test result for the release of the multiple releases corresponding to a position of the release in the time ordering of the releases.

11. The computer program product of claim 9, wherein the method comprises:
   computing, by said processor, the test result stability index for each release (R) of each test case as being equal to $T_R/N_R$, wherein $T_R$ is a total number of consecutive releases including and prior to said each release (R) for which the test result is the first character string denoting the pass status, wherein $N_R$ is a total number of releases including and prior to said each release (R) starting with the first release of the multiple releases, and wherein said calculating the test result stability index for each test case consists of said computing the test result stability index for the last release of the multiple releases for said each test case.

12. The computer program product of claim 9, wherein the weight at each release after the first release exceeds the weight at each other release that is prior to said each release.

13. The computer program product of claim 9, wherein the method further comprises:

for each group of the multiple groups, determining, by said processor, a group test result stability index from the test result stability indexes of the test cases belonging to said each group;

for each group of the multiple groups, determining, by said processor, a group module stability index from the test result stability indexes of the test cases belonging to said each group;

selecting, by said processor, a plurality of test cases from the multiple test cases such that the plurality of test cases consist of fewer test cases than the multiple test cases, said selecting the plurality of test cases being based on both the determined group test result stability index and the determined group module stability index of all groups of the multiple groups.

14. The computer program product of claim 9, wherein said selecting the plurality of test cases comprises:

receiving, by said processor, a specification of both a group test result stability index threshold and a group module stability index threshold;

for each group, determining, by said processor, whether a condition is satisfied, said condition selected from the group consisting of the group test result stability index not exceeding the specified test result stability index threshold, the group module stability index not exceeding the specified group module stability index threshold, and a combination thereof;

for each group for which the condition is determined to be satisfied, selecting, by said processor, only a single test case from said each group to be included in the plurality of test cases, wherein the selected single test case has a shortest time period of the test cases in the group;

for each group for which the condition is determined to not be satisfied, selecting, by said processor, all test cases from said each group to be included in the plurality of test cases.

15. The computer program product of claim 14, wherein the condition is determined to be satisfied for one or more groups of the multiple groups.

16. The computer program product of claim 14, wherein the condition is determined to not be satisfied for one or more groups of the multiple groups.

* * * * *